(12) United States Patent
Shaffer

(10) Patent No.: US 8,405,003 B2
(45) Date of Patent: Mar. 26, 2013

(54) OVEN HAVING DIFFUSE LIGHT PIPE ASSEMBLY

(75) Inventor: Timothy Scott Shaffer, LaGrange, KY (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 12/950,629

(22) Filed: Nov. 19, 2010

(65) Prior Publication Data

US 2012/0125911 A1 May 24, 2012

(51) Int. Cl.
*A21B 3/10* (2006.01)

(52) U.S. Cl. ......... 219/393; 219/391; 99/341; 126/19 R; 126/273 R; 126/190; 126/200

(58) Field of Classification Search .................. None
See application file for complete search history.

(56) References Cited

U.S. PATENT DOCUMENTS

| | | | | |
|---|---|---|---|---|
| 2,281,608 | A * | 5/1942 | Vincent | 126/200 |
| 4,598,693 | A * | 7/1986 | Koziol | 126/41 R |
| 5,938,962 | A * | 8/1999 | Adamski et al. | 219/506 |
| 5,960,785 | A * | 10/1999 | Byrne et al. | 126/200 |
| 7,874,690 | B2 * | 1/2011 | Weber et al. | 362/92 |
| 8,227,002 | B2 * | 7/2012 | Douglas et al. | 219/506 |
| 2005/0259931 | A1 | 11/2005 | Gaydoul et al. | |
| 2007/0163568 | A1 * | 7/2007 | Murray et al. | 126/50 |
| 2010/0151103 | A1 * | 6/2010 | Douglas et al. | 426/523 |
| 2010/0154653 | A1 * | 6/2010 | Douglas et al. | 99/385 |
| 2012/0000455 | A1 * | 1/2012 | Reinhard-Herrscher et al. | 126/19 R |
| 2012/0175365 | A1 * | 7/2012 | Do et al. | 219/758 |
| 2012/0180776 | A1 * | 7/2012 | Newsom et al. | 126/197 |

FOREIGN PATENT DOCUMENTS

| | | | |
|---|---|---|---|
| DE | 3445923 A1 * | 8/1985 | |
| DE | 4100605 A1 * | 7/1992 | |
| DE | 10301078 A1 * | 7/2004 | |
| EP | 922910 A1 * | 6/1999 | |

OTHER PUBLICATIONS

DE 4100605 A1, Hurst et al, Jul. 1992, partial translation.*
DE 10301078 A1, Klemp et al, Jul. 2004, partial translation.*

* cited by examiner

*Primary Examiner* — Joseph M Pelham
(74) *Attorney, Agent, or Firm* — Global Patent Operation; Douglas D. Zhang

(57) ABSTRACT

An oven has a plurality of walls defining an oven cavity, a light source disposed outside of a wall of the oven cavity, and an optical light pipe in optical communication with the light source. The light pipe has a central body portion disposed within the oven cavity, and an end portion extending from the central body portion, the end portion extending outside of the oven cavity and being in optical communication with the light source. The central body distributes light from the light source within the oven cavity.

18 Claims, 9 Drawing Sheets

OVEN HAVING DIFFUSE LIGHT PIPE ASSEMBLY

BACKGROUND OF THE INVENTION

The present disclosure generally relates to appliances, and more particularly to an interior lighting arrangement for an oven.

Current arrangements for lighting an interior of an oven typically use one or more incandescent or halogen lights mounted within an interior space of the oven cavity. However, the placement of racks, baking utensils, or the food items can result in unfavorable shadows that diminish visibility of the food items or objects within the interior of the oven. In addition, high temperatures experienced during normal bake and self-clean operations can adversely affect the life of the light source within the oven. Further, light originating from spot sources, particularly when located within a direct view of a user, can generate glare that diminishes food item visibility.

Accordingly, it would be desirable to provide a lighting arrangement that overcomes at least some of the problems identified above.

BRIEF DESCRIPTION OF THE INVENTION

As described herein, the exemplary embodiments overcome one or more of the above or other disadvantages known in the art.

One aspect of the exemplary embodiments relates to an oven. In one embodiment the oven has a plurality of walls defining an oven cavity. A light source is disposed outside of a wall of the oven cavity, and is in optical communication with an optical light pipe. The light pipe has a central body portion disposed within the oven cavity, and an end portion extending from the central body portion. The end portion extends outside of the oven cavity and is in optical communication with the light source. The central body distributes light from the light source within the oven cavity.

Another aspect of the exemplary embodiments relates to a light pipe assembly for use within an appliance having an interior space defined by a plurality of inner walls. The light pipe assembly includes a light source and an optical light pipe. The light source is adapted to be disposed outside of the interior space in optical communication with an end of the optical light pipe. A central body of the optical light pipe is disposed within the interior space to distribute light from the light source.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
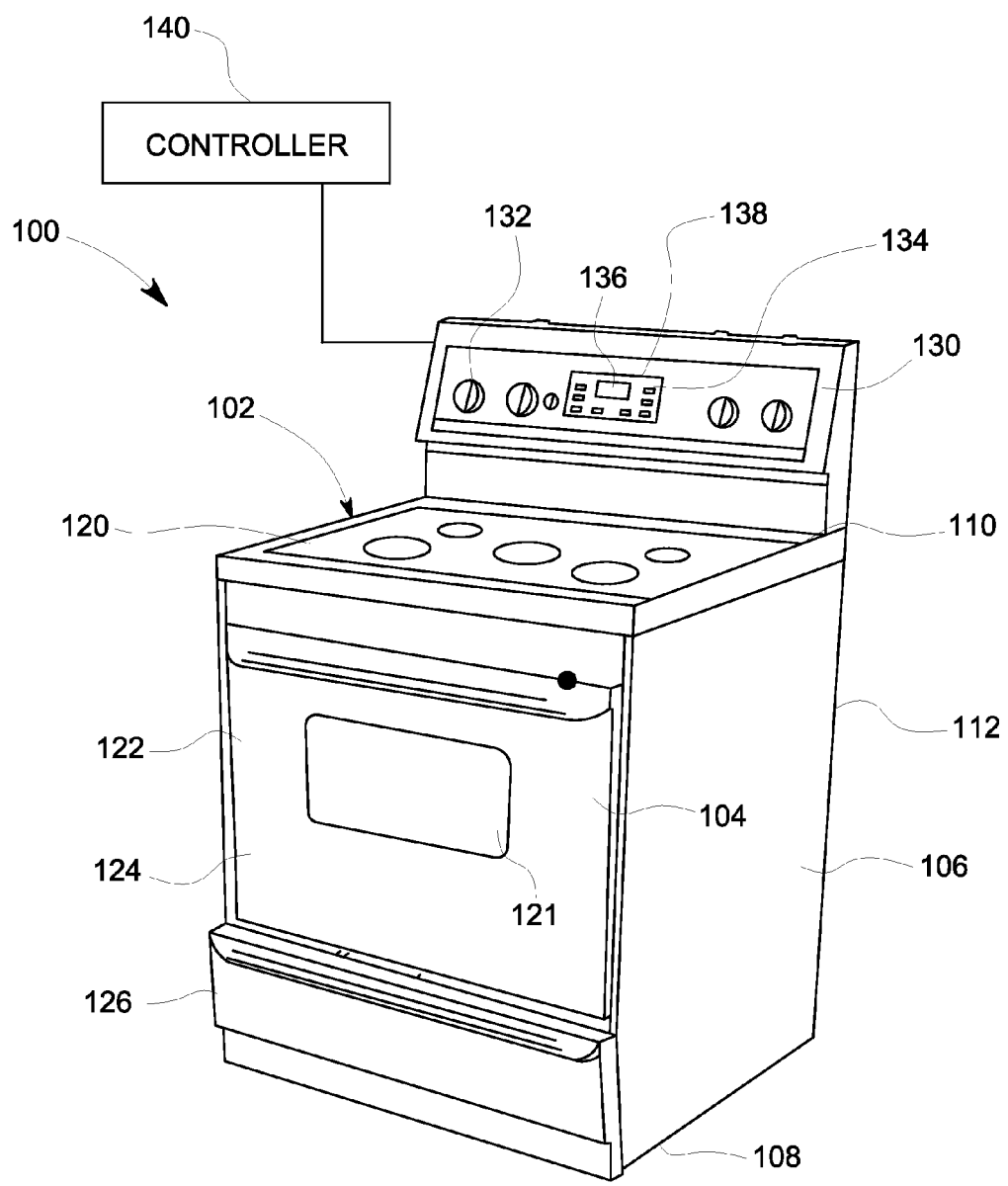
FIG. 1 is a perspective view of an exemplary range incorporating aspects of the disclosed embodiments.

Referring to FIG. 1, an exemplary appliance such as a freestanding range in accordance with the aspects of the disclosed embodiments is generally designated by reference numeral 100. The aspects of the disclosed embodiments are generally directed to transporting light through glass conduits to diffuse light directly into an oven cavity. Although a range 100 is shown in FIG. 1, the aspects of the disclosed embodiments can be applied to any appliance that requires a lighting system, such as a refrigerator, for example. The aspects of the disclosed embodiments are generally directed to a light source mounted in a "cool" zone outside of an oven cavity and a light pipe that diffuses and transfers light generated by the light source into oven cavity.

As is shown in FIG. 1, the range 100 includes a cabinet or housing 102 that has a front portion 104, opposing side panels 106, a base or bottom portion 108, a top portion 110, and a back panel 112. In the embodiment shown in FIG. 1, the top portion 110 of the range 100 includes a cooktop 120. Alternate embodiments, can include wall ovens.

The range 100 also includes an oven unit 122. Although the aspects of the disclosed embodiments are described herein with respect to the single oven configuration shown in FIG. 1, in alternate embodiments, the range 100 could comprise a multiple oven unit. Additional alternate cooking appliance embodiments can include a free standing gas or electric range, a wall oven, a gas oven, a speed cooking oven or a dual fuel oven. Referring again to FIG. 1, the range 100 includes an oven door 124 and a pullout drawer 126, the operation of which is generally understood.

In one embodiment, the cabinet 102 of the range 100 includes a control surface 130 that supports one or more controls, generally referred to herein as burner controls 132. The burner control or control knob 132 shown in FIG. 1 is generally in the form of a knob style control that extends outwardly from and can be supported by the control surface 130, which in one embodiment comprises a backsplash. In one embodiment, a control panel 138 includes a plurality of input selectors or switches 134 and a display 136 cooperating with control knob 132 to form a user interface for selecting and displaying cooking cycles, warming cycles and/or other operating features, including enabling lighting of an interior of the oven unit 122. In one embodiment, the input selectors or controls 134 can be in the form of push buttons or electronic switches.

In one embodiment, the range 100 includes a controller 140. The controller 140 is coupled to, or integrated within, the control panel 138 and configured to receive inputs and commands from for example, the controls 132 and 134, and control the various operations and functions of the range 100. In one embodiment, the controller 140 can include or comprise an electronic range control, and can also be used to control the lighting system of the oven unit 122, as is further described herein.

Figure 2:
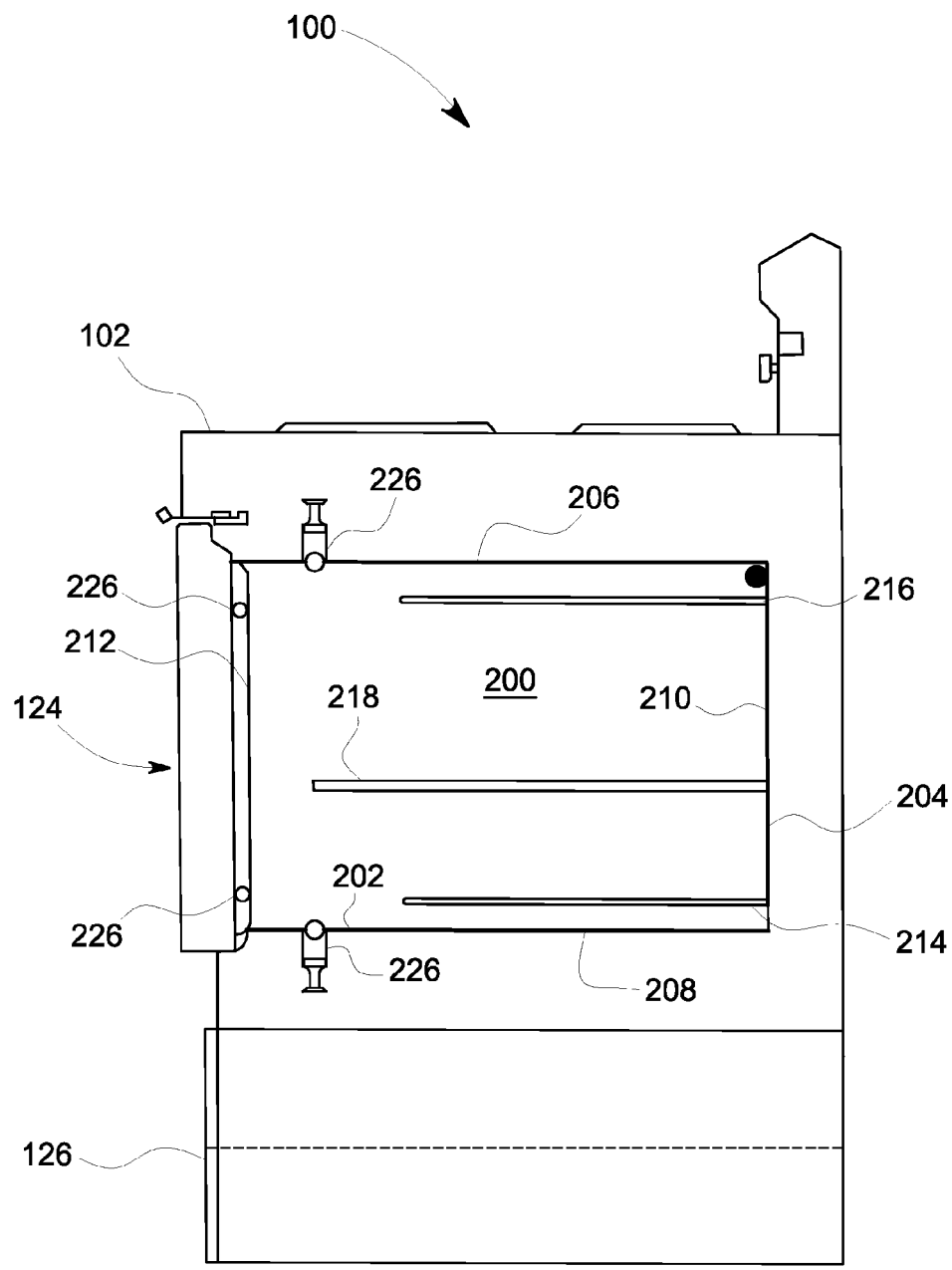
FIG. 2 is a cross-sectional view of the range illustrated in FIG. 1.

FIG. 2 is a cross-sectional side view of the range 100 shown in FIG. 1. Positioned within cabinet 102 is a cooking chamber or oven cavity 200 (also herein referred to as an "oven interior space"). The oven cavity 200 is formed, or defined, by the walls or panels of oven liner 202. The oven liner 202 includes side walls 204, top wall 206, bottom wall 208, rear wall 210, and a front wall 212. In one embodiment, the front wall 212 is part of the oven door 124.

The oven cavity 200 is provided with at least one heating element, such as a lower heating element 214 or upper heating element 216. In one embodiment, the lower heating element 214 is positioned adjacent bottom wall 208 and the upper heating element 216 is positioned adjacent top wall 206. In one embodiment, the lower and upper heating elements 214, 216 are referred to as bake and broil heating elements. In alternate embodiments, the heating elements can be arranged in any suitable manner. Although the heating elements 214, 216 are generally described herein as lower and upper heating elements, the heating elements can include multiple parts, located in various portions of the oven cavity, where each part is separately powered and controlled. In an exemplary embodiment, at least one cooking rack 218 for supporting an object is positioned within the oven cavity 200.

As will be described in further detail below, in one embodiment, the range 100 includes one or more light pipe assemblies 226 for illuminating the oven interior space 200. In the embodiment shown in FIG. 2, the range 100 includes four light pipe assemblies. Two light pipe assemblies 226 are disposed within the door 124. A light pipe assembly 226 is disposed within the top wall 206 of the oven liner 202 and another light pipe assembly 226 is disposed in the bottom wall 208 of the oven liner 202. In alternate embodiments, any number of light pipe assemblies 226 can be incorporated into the range 100, in any suitable location for illuminating the interior space of oven cavity 200.

Figure 3:
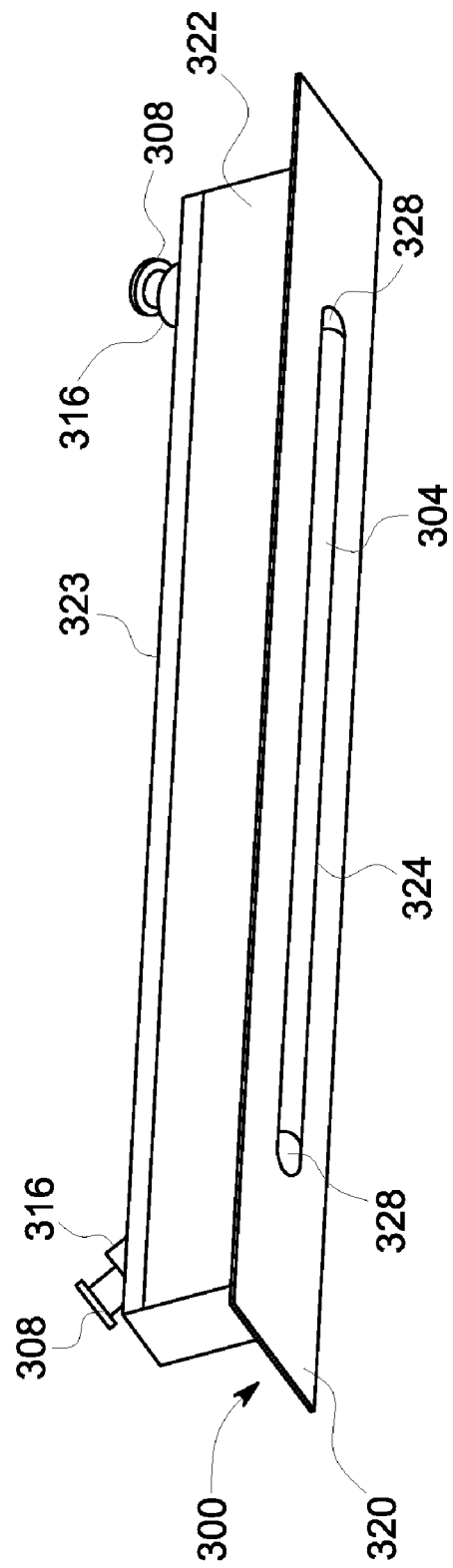
FIG. 3 is a perspective view of an exemplary light pipe assembly incorporating aspects of the disclosed embodiments.
Figure 4:
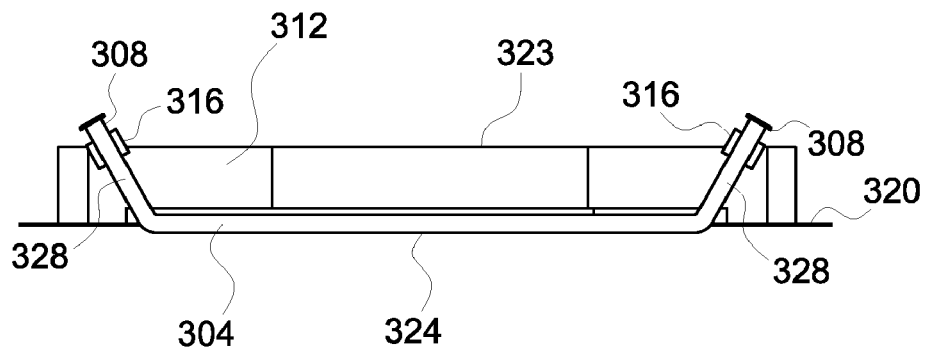
FIG. 4 is a top down cross-sectional view of the diffuse light pipe assembly illustrated in FIG. 3.
Figure 5:
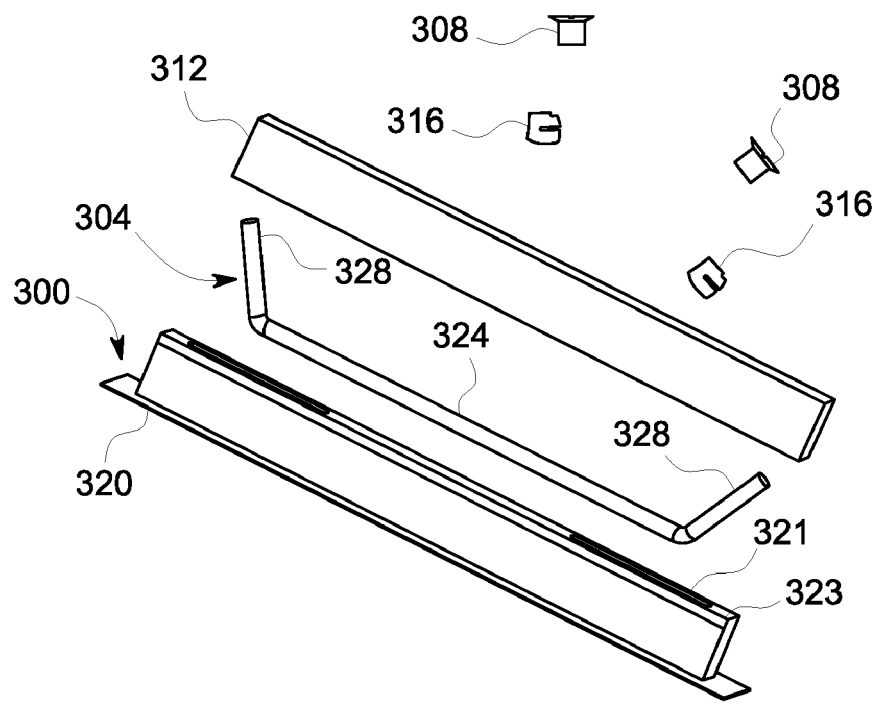
FIG. 5 is an exploded assembly view of the light pipe assembly illustrated in FIG. 3.

FIG. 3 illustrates one embodiment of a light pipe assembly 226. In this embodiment, the light pipe assembly 226 includes a housing 300, an optical light pipe 304 and at least one light source 308. The wiring for the light source 308 is not shown. The housing 300 includes a flange or face portion 320 and a body portion 322. The flange 320 is generally a high temperature flange and is configured to be disposed within the oven cavity 200. The light pipe 304 has a central portion 324 and end portions 328. The central portion 324 is configured to be disposed in the oven cavity 200. Generally, the central portion 324 is disposed against the flange 320 facing an interior of the oven cavity 200. An end portion 328 extends from each side of the central portion 324 to a light source 308 that is located outside of the oven cavity 200. The end portion 328 is optically coupled to the light source 308. In one embodiment, as shown in FIG. 4, the end portion 328 extends through an insulation liner 312 and a back surface 323 of the housing 300. As illustrated in FIG. 5, the housing 300 can include an opening 321 that allows the light pipe 304 and insulation liner 312 to be inserted into the housing 300. The back surface 323 can comprise a retaining member that can secure the insulation liner 312 and light pipe 304 within the housing 300.

FIG. 4 illustrates a cross-sectional view of the light pipe assembly 226 of FIG. 3, while FIG. 5 illustrates an exploded assembly view of the light pipe assembly 226 shown in FIG. 3. As shown in FIGS. 4 and 5, the light pipe assembly 226 may include one or more retainers 316 to position and secure the light pipe 304 within the housing 300, as well as to shield the light sources 308 from heat within the oven cavity 200. The insulation liner 312 can further shield the light source 308 from the heat of the oven cavity 200.

It will be appreciated that the central body 324 of the light pipe 304 is disposed towards or within the oven cavity 200 of the oven 100, while the end portion 328 of the light pipe 304 is disposed away from the heat in the oven cavity 200, towards or on an exterior of the oven liner 202, generally referred to as a "cool zone." In an exemplary embodiment, at least the central body portion 324 of the light pipe 304 includes a material capable of satisfactory light transmission and exposure to the heat and temperatures that are typically sustained during cooking and cleaning cycles within oven cavity 200. One example of such a material is borosilicate glass. In alternate embodiments, any suitable material that is capable of withstanding high heat temperatures and provides suitable light transmission can be used.

As shown in FIG. 3, the end portion 328 of the light pipe 304 is in optical communication with the light source 308, and the light pipe 304 distributes light from the light source 308 to the central body 324 of the light pipe 304 to illuminate the interior of the oven cavity 200. Because the end portion 328 is disposed outside of the oven cavity 200 and is shielded from the heat therein, the light source 308 need not be adapted to withstand the heat from within the oven cavity 200. Stated alternatively, the light pipe assembly 226 isolates the light source 308 from the temperatures within the oven cavity 200. One exemplary light source 308 includes light emitting diodes (LEDs), which are typically limited to operational environments that are below approximately 85 degrees Centigrade. Use of LED light source 308 is contemplated to reduce energy requirements for lighting of the oven cavity 200 from approximately 40 watts to 12 to 15 watts. While an embodiment has been disclosed using LED light sources, it will be appreciated that other light sources are within the scope of the disclosure, such as incandescent lamps, fluorescent lamps, high-intensity discharge lamps, and others, for example.

Figure 6:
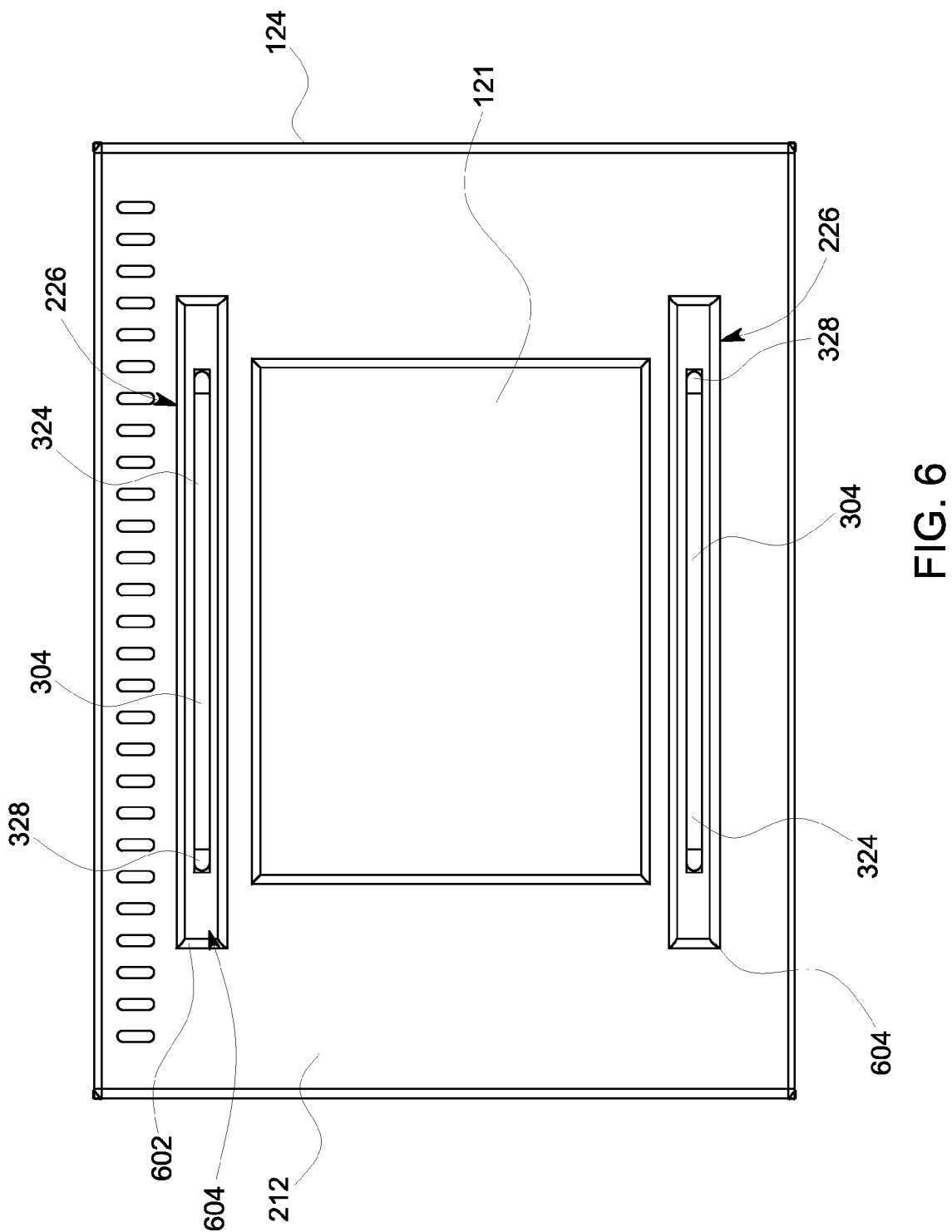
FIG. 6 illustrates an exemplary light pipe assembly incorporating aspects of the disclosed embodiments in an oven door installation.

FIG. 6 illustrates one embodiment of a light assembly 226 disposed in the front wall 212 of the oven liner 202, which in this embodiment is part of the oven door 124. Although the example of FIG. 6 illustrates two light pipe assemblies 226, one mounted above and below the glass 121 of the door 124, in alternate embodiments, any suitable number of light pipe assemblies 226 can be used and mounted in any suitable location. For example, in one embodiment, a light pipe assembly 226 could be included on one or more of the left, right, top and bottom of the front wall 212.

In the example of FIG. 6, the light assembly 226 is received into an opening 602 in the front wall 212. In one embodiment, the opening 602 includes a recess 604 that allows the light pipe 304 to remain substantially flush with a surface of the front wall 212. Although FIG. 6 is only described with respect to a light assembly 226 mounted in opening 602 in the front wall 212 of the oven door 124, it will be understood that the side walls 204, top 206 and bottom walls 208 of the oven liner 202 could include similar openings 602 into which a light assembly 226 of the disclosed embodiments could be received. While the light assembly 226 is generally described herein as a separate component assembled to the oven liner 202, in one embodiment, the light assembly 226 and flange 320 form integral parts of the oven liner 202. For example, the flange 320 and housing 300 can be formed as an integral part of the interior liner of the door 124, wherein the light pipe 304 extends through suitable openings in the interior liner of door 124.

Figure 7:
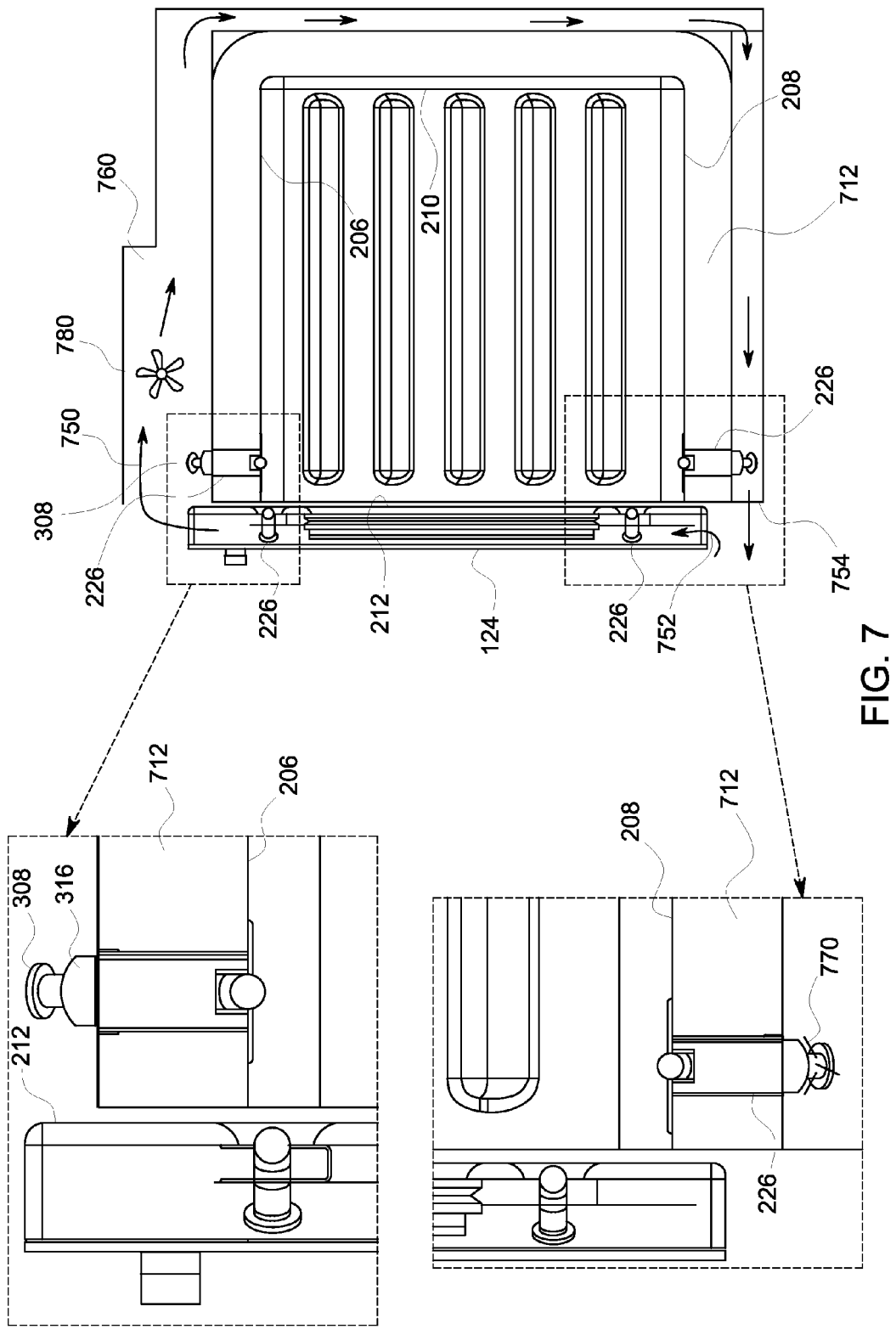
FIG. 7 is a cross-sectional view of an oven cavity incorporating aspects of the disclosed embodiments.

FIG. 7 depicts a partial side cross-sectional view of one embodiment of an oven unit 122 illustrating the light pipe assemblies 226 incorporated in the door 124 and top and bottom walls 206, 208. The oven depicted in FIG. 6 includes four light pipe assemblies 226. Two light pipe assemblies 226 are disposed within the door 124 of the oven, and one in each of the top wall 206 and bottom wall 208 of the oven liner 202. As is shown in this example, each of the walls 206, 208 and 210 include insulation 712 disposed therein. In one embodiment, as is shown in FIG. 7, the insulation 712 is contiguous around the outside of the oven cavity 200. In accordance with the aspects of the disclosed embodiments, the light source 308 is positioned on an outside of the insulation 712.

In the example shown in FIG. 7, the oven unit 122 can include an air flow path 750 (designated by arrows) within a cooling zone 760 extending around an exterior of the walls 206-210 defining the oven cavity 200. As is shown in the embodiment of FIG. 7, the light sources 308 are disposed within the flow path 750 or cool zone. In one embodiment, a cooling medium, such as air for example, is circulated through the air flow path 750, thereby cooling the light sources 308. In some embodiments, one or more of the light sources 308 may include a heat removal device, such as one or more heat fins 770 attached thereto.

The configuration of the flow path 750 is generally known, and can include an air intake 752 within the door 124 and an exhaust 754 below the bottom edge of oven door 124. In one embodiment, air enters the interior of the oven door 124 through the intake 752 in the bottom portion of the door 124 and travels up through the door 124, around the oven cavity 200 and out the exhaust 754. In alternate embodiments, the intake and exhaust 752, 754 can be suitably located to promote the removal of heat from the oven unit 122. In a manner that will be understood, the cooling zone 760, or air flow path similar to the air flow path 750 can extend, around each of the side walls 204, as well as the front wall 212. In one embodiment, a fan 780 may be used to enhance the flow of air through the flow path 750.

It will be appreciated that while the embodiment depicted in FIG. 7 includes four light pipe assemblies and a fan to enhance the flow of air as a cooling medium, the scope of the disclosure is not so limited, and may include ovens 100 with other numbers and arrangements of light pipe assemblies 226, such as one, two, three, five, or more disposed elsewhere in the oven liner 202 of the oven cavity 200, and a flow path 750 that may utilize natural convection, or other cooling mediums circulating through a closed loop heat exchanger, for example.

Figure 8:
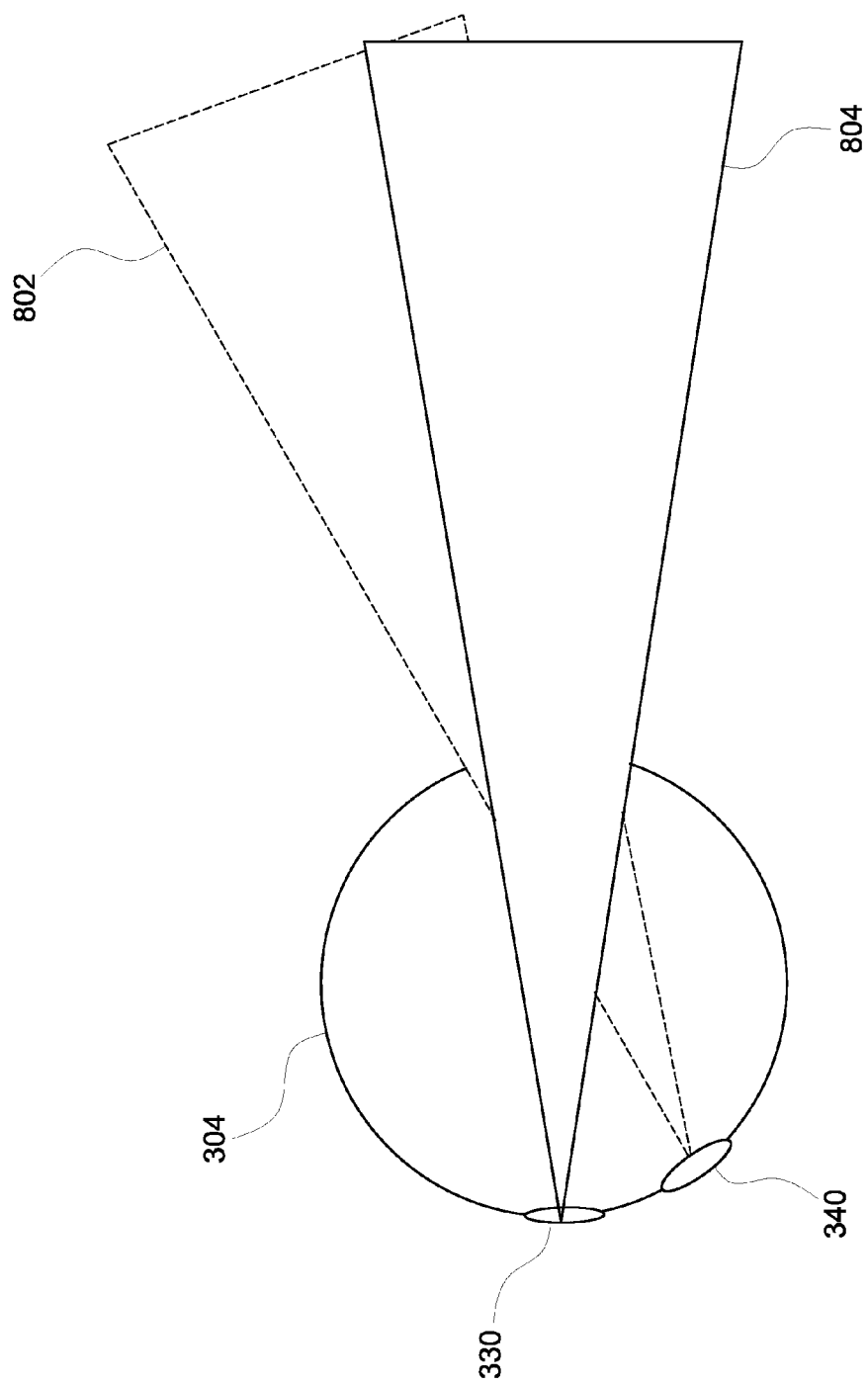
FIG. 8 is a cross-sectional end view of a light pipe incorporating aspects of the disclosed embodiments.

FIG. 8 depicts a cross section view through an exemplary light pipe 304. In an embodiment, the light dispersion from the central body 324 of the light pipe 304 can be directed and diffused by modifying an exterior surface or geometry of the light pipe 304. For example, in one embodiment, a reflective material 330, 340 may be added onto the light pipe 304 to trip up the flow of visible light through the light pipe 304. The reflective material 330, 340 is of a type that is capable of withstanding the expected range of oven temperatures, which can be as high as approximately 900 degrees Fahrenheit. In one embodiment, the reflective material 330, 340 is a ceramic white or shiny type coating. For example, a temperature resistant coating such as aluminum oxide can be applied or used in conjunction with borosilicate tubes. In general, addition of reflective material 330, 340 on a backside of the light pipe 304 can prompt light to spill out of the light pipe 304 into the oven cavity 200 to provide a diffuse light pattern that is reflected forward, normal to the reflective material location. Therefore, the placement location of the reflective material 330, 340 influences the direction of the reflected light. For example, a representative light pattern 802, resulting from placement location of reflective material 340 in FIG. 8, may be refracted off in a divergent pattern, while a representative light pattern 804, resulting from the placement location of reflective material 330 in FIG. 8 may be refracted into the oven cavity 200. Exemplary reflective material includes a light ceramic paint, such as aluminum oxide for example. In alternate embodiments, other suitable reflective materials and application methods may be used, such as ceramic or metal shrouds, materials deposited via CVD or PVD, or embedded within the material of the light pipe, for example.

Figure 9:
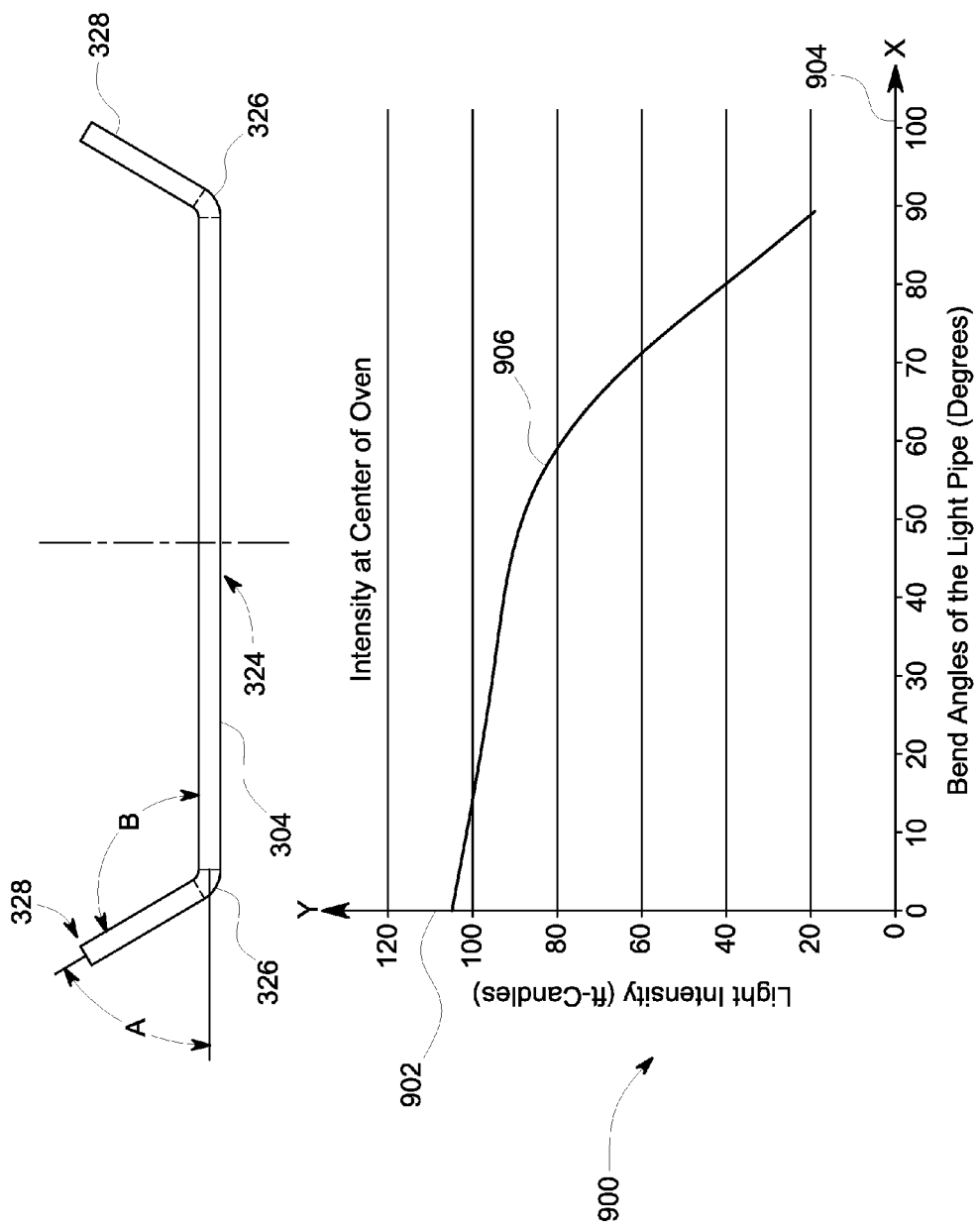
FIG. 9 is a plan view of a light pipe incorporating aspects of the disclosed embodiments and a graph of light pipe intensity as a function of pipe bend angle.

FIG. 9 illustrates an exemplary light pipe 304 having a bend portion or member 326 that is disposed at an angle A, or an included angle B, between the central body 324 and the end portion 328. The bend member 326 can be a separate piece used to adjust the angle between the central body portion 324 and end portion 328 of the light pipe 304. Alternatively, the bend member 326 can be integral to one of the central body portion 324 or end portion 328, when the light pipe 304 is formed from different segments. In an embodiment where the light pipe 304 is of unitary fabrication, the bend member 326 is integral to the light pipe 304.

In one embodiment, the angle of the bend member 326 between the central portion 324 and the end portion 328 enhances the isolation of heat transmitted to from the central portion 324 to the light source 308 by allowing the light source 308 to be located away from the oven cavity 200, and outside of the walls of the oven liner 202. The degree of the angle can also be used to enhance the light intensity transferred by the light pipe 304 from the light source 308 to the central portion 324.

FIG. 9 also shows a graph 900 of light intensity as measured at the center of the oven cavity 200 as a function of the bend angle A between the central portion 324 and the end portion 328 of the light pipe 304. The Y axis 902 of the graph represents the light intensity transferred by the light pipe 304 onto an approximate center region of the oven cavity 200 and the X axis 904 represents different values of bend angle A. A function curve 906 represents the observed values of light intensity as a function of bend angle A. At values of bend angle A greater than approximately 60 degrees, (or included angle B less than 120 degrees) the light intensity transmitted into the center of the oven cavity 200 begins to decrease rapidly. Accordingly, it is contemplated to utilize light pipes 304 with angles A less than or equal to 60 degrees, or included angles B equal to or greater than approximately 120 degrees.

Figure 10:
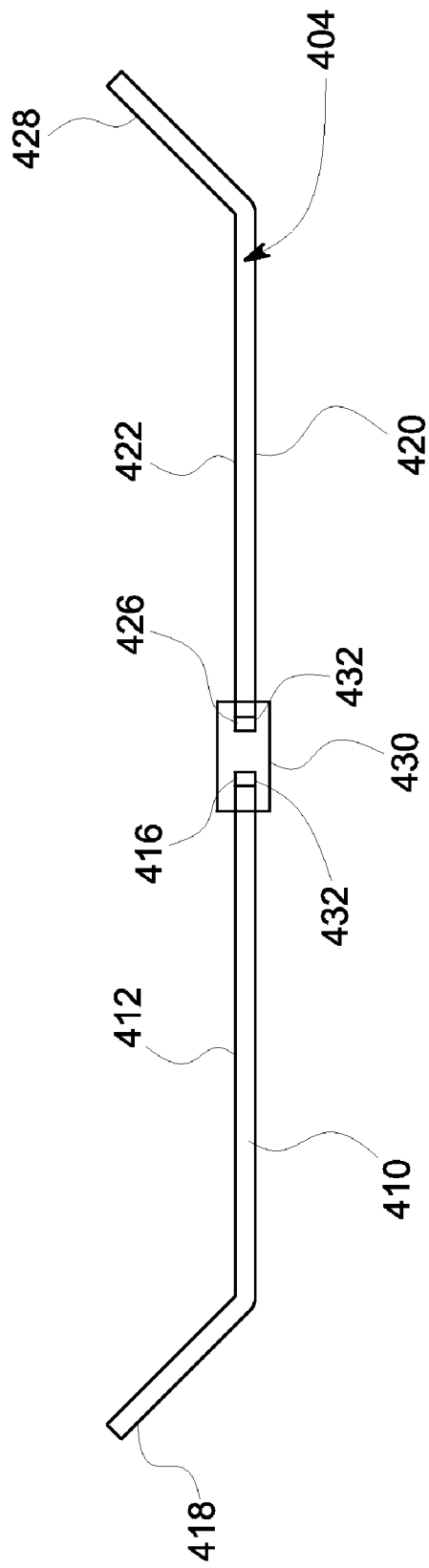
FIG. 10 is a plan view of another embodiment of a light pipe incorporating aspects of the present disclosure.

FIG. 10 depicts a plan view of another embodiment of a light pipe 404 incorporating aspects of the present disclosure. In this embodiment, the light pipe 404 is formed of segments and includes a first segment 410 and a second segment 420. The segments 410, 420 each have a first end 418, 428 and a second end 416, 426, respectively. A joining member or cap 430 joins together the respective second ends 416, 426 of the first segment 410 and second segment 420.

As described herein, each segment 410, 420 includes a first end portion 418, 428, substantially opposite the second ends 416, 426, respectively. Each first end portion 418, 428 is configured to be disposed in the cooler zone of the oven 100, outside of the oven cavity 200. Each first end portion 418, 428 is in optical communication with a light source, such as the one 308 shown in FIG. 4. Each segment 410, 420 also includes a central body portion 412, 422 that is configured to diffuse and distribute light from each light source 308 into the oven cavity 200. The second ends 416, 426 of each segment 410, 420, respectively, may include a reflector or reflective coating 432 to enhance light transfer from the segments 410, 420 of the light pipe 404 into the oven cavity 200. In one embodiment, the light pipe 404 is configured to enhance an ease of assembly into an oven door 124 or wall of oven liner 202 by allowing the light pipe 404 to be made up of separate portions or pieces.

The aspects of the disclosed embodiments provide lighting in an appliance such as an oven. The light source is located in a cool zone, such as within the door of an oven, between the insulation guard and the front glass panel, away from the heat of the oven cavity and the light is transported through glass conduits to direct light into the oven cavity. The light source can be equipped with a heat removal device to remove excess heat from the light source. The light pipes allow use of efficient light sources such as light emitting diodes that are not otherwise compatible with oven operating temperatures. These efficient light sources can reduce energy requirements and provide dimming to optimize viewing of baking products. The placement of light pipes outside of a direct user sight line eliminates harshness associated with viewing the light source. This diffuse lighting can also reduce shadows when adding racks or placing objects on oven racks, and enable clearer visibility of the objects within the oven cavity.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An oven comprising:
   a plurality of walls defining an oven cavity;
   a light source disposed outside of a wall of the oven cavity; and
   an optical light pipe in optical communication with the light source, the optical light pipe comprising:
      a central body portion disposed within the oven cavity;
      an end portion extending from the central body portion to a point outside of the oven cavity, the end portion being in optical communication with the light source, wherein the central body portion distributes light from the light source within the oven cavity; and
      an angled portion between the end portion and the central body portion so that the central body portion and the end portion form an included angle.

2. The oven of claim 1, wherein the included angle is greater than 120 degrees.

3. The oven of claim 1, wherein the optical light pipe comprises borosilicate glass.

4. The oven of claim 1, further comprising a light pipe housing member configured to be received in an opening in a wall of the oven cavity, the light pipe housing member including a recess on a flange of the housing member facing an interior of the oven cavity, the recess configured to receive the central body portion of the light pipe, and an insulation member in the light pipe housing member, the end portion of the light pipe extending through the insulation member.

5. The oven of claim 4, wherein the housing member is disposed in a door panel of the oven.

6. The oven of claim 5, wherein the central body portion in the recess is flush with an oven cavity facing surface of the door panel.

7. The oven of claim 1, wherein the light source comprises a light emitting diode.

8. The oven of claim 1, further comprising a heat removal device disposed on the light source.

9. The oven of claim 1, further comprising a cooling flow path around an exterior of the oven cavity, the light source being disposed in the cooling flow path.

10. The oven of claim 1, wherein the light pipe comprises:
    a first segment and a second segment;
    an end portion on each of the first segment and the second segment;
    a reflective material disposed on each of the end portions; and
    a joining member configured to join the end portions of the first segment and the second segment.

11. A light pipe assembly for use within an appliance comprising a plurality of inner walls defining an interior space, the light pipe assembly comprising:
    a light pipe comprising a central body portion, an end portion, and a bended portion between the central body portion and the end portion so that the central body portion and the end portion form an included angle, the central body portion being configured to be disposed with the interior space of the appliance, and the end portion being configured to be disposed outside of the interior space of the appliance; and
    a light source disposed outside of the interior space in optical communication with the end portion.

12. The assembly of claim 11, further comprising
    a housing member;
    a flange on the housing member;
    a recess on the flange configured to receive the central portion of the light pipe;
    an insulation member within the housing member;
    an opening in the housing and insulation member configured to receive the end portion of the light pipe.

13. The assembly of claim 11, wherein the central body portion comprises a borosilicate glass.

14. The assembly of claim 11, further comprising a high temperature resistant backside reflector in the central body portion.

15. The assembly of claim 14, wherein the backside reflector comprises a reflective paint.

16. The assembly of claim 11, wherein the light source comprises a light emitting diode.

17. The assembly of claim 11, wherein the included angle is greater than 120 degrees.

18. The assembly of claim 11, wherein the central body portion of the light pipe comprises:
    a first segment and a second segment;
    an end portion on each of the first segment and the second segment;
    a reflective material disposed on each of the end portions; and
    a joining member configured to join end portions of the first segment and the second segment.

* * * * *